United States Patent Office 2,823,925
Patented Feb. 18, 1958

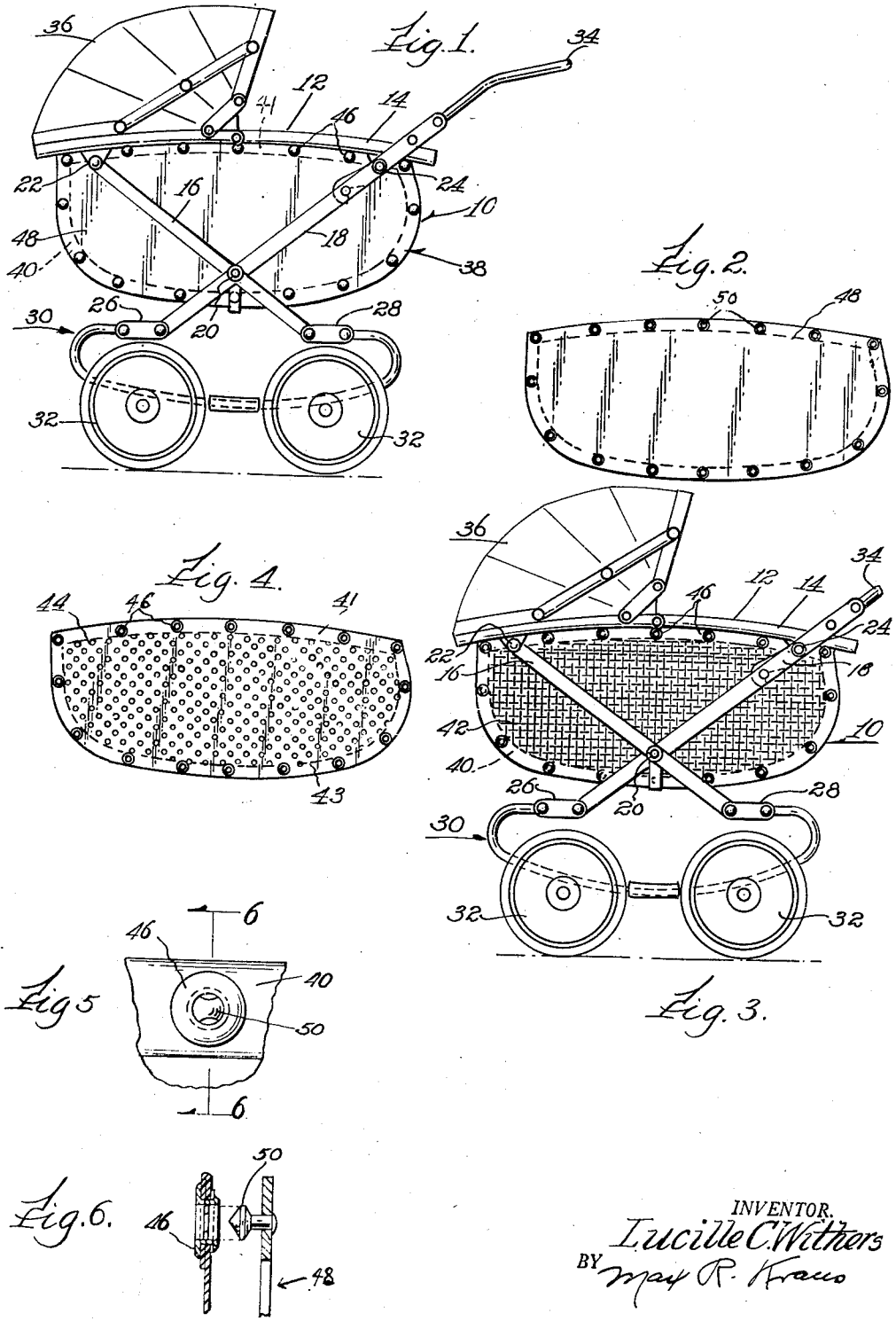

2,823,925

VENTILATED BABY CARRIAGE AND MEANS FOR CLOSING THE VENTILATOR

Lucille C. Withers, Berwyn, Ill.

Application September 28, 1953, Serial No. 382,597

3 Claims. (Cl. 280—47.38)

This invention relates to improvements in baby carriages or baby buggies and the like.

One of the objects of this invention is to provide an improved baby carriage or buggy which may be ventilated during warm or hot weather and may also be enclosed for inclement or cold weather.

Another object of this invention is to provide a baby carriage which is adapted to provide maximum comfort for the child in hot, cold and inclement weather.

The baby buggies or carriages of the prior art are such that the cab portion of the buggy is enclosed on the sides and ends thereof. While this is desirable in cold or inclement weather, carriages of such construction are objectionable in warm or hot weather for the reason that there is no ventilation in the cab which makes the child very uncomfortable. With this invention I have provided a baby carriage in which the sides of the cab are formed of a structure which permits the cab to be completely ventilated during hot weather, and I also provide means whereby the sides of said cab may be covered with closure panels or the like to block off and enclose the side walls of the cab so that same may serve as an enclosed cab structure in time of cold or inclement weather, thus providing a baby carriage which may be used all year round with equal facility.

In addition to the aforementioned, I have also provided a baby carriage structure which is collapsible so that same may be collapsed and carried in an automobile or the like.

Other objects will become apparent as this description progresses.

In the drawings:

Fig. 1 is a side elevational view of the baby carriage showing the side closure panel secured in place to enclose the cab structure.

Fig. 2 is a side elevational view of the closure panel, as shown in Fig. 1.

Fig. 3 is a side elevational view of the baby carriage with the closure panel removed and showing the exposed side panel of the carriage.

Fig. 4 is a side elevational view of a cab structure with a modified form of side panel, showing another type of ventilating material.

Fig. 5 is an enlarged elevational view showing the attaching means for attaching the closure panel to the side of the baby buggy.

Fig. 6 is a cross-sectional view taken on line 6—6 of Fig. 5.

The baby carriage generally indicated by the numeral 10 has a cab generally indicated at 12. The carriage is collapsible and includes a top horizontal metal frame member 14 of substantially rectangular shape. The framework of the carriage also includes side bars 16 and 18 which cross each other and are pivotally secured to each other as at 20 and are pivotally secured to the frame member 14 as at 22 and 24 respectively. The lower ends of the side bars 16 and 18 are each secured to links 26 and 28 which in turn have their opposite ends secured to the base carriage structure generally indicated at 30 on which are secured the usual wheels 32. A U-shaped handle bar 34 is pivotally secured to the side members 18. The handle is locked in extended position and is adapted to be pivoted forwardly over the cab when the unit is collapsed. A hood generally indicated at 36 is secured to the top of the carriage. It will be understood that the opposite side of the carriage is similar to that described. The framework and structure heretofore described is well known in the art and is of conventional character. The collapsing of same is also well understood and need not be described.

Secured to the front and rear of frame member 14 is a panel generally indicated at 38 which may be leather, fabric or the like and which extends below the frame 14 and forms the front bottom and rear of the cab and is the cot or supporting surface of the cab. This likewise is collapsible. The panel 38 has side borders 40 which are formed at substantially right angles to the plane of the panel 38. These borders extend along the opposite sides of the panel 38. Borders 41 of fabric material are secured to the opposite sides of the frame 14 to extend slightly below same. Stitched or otherwise secured to the inside of the borders 40 and 41 are side panels 42. The side panels 42 together with the panel 38 form the cab of the carriage. The side panels are of open network construction, similar in mesh to wire screening used for windows in the home. The screening material is preferably made of plastic threads and is of a highly flexible nature so that when the carriage is collapsed the side panels will likewise collapse accordingly and will not become unduly distorted. This material is presently on the market and appears similar to conventional wire screening. However, its flexible character permits it to be used in this invention with excellent results. It will be understood that the two side panels 42 on the opposite sides of the cab are of identical construction and that such construction permits ventilation of the cab, yet the side panels provide sufficient body for the cab structure. It will be seen that the air can pass through the sides of the cab unobstructed and provide maximum comfort for the child during hot weather. While I have shown and described a specific form of screening material, it will be understood that other types of reticulated or open network material may be used. Likewise, for example, a plastic sheet 43 such as shown in Fig. 4 may be provided with a large number of spaced openings 44. Various other types and styles of ventilated sides made from any known material may be employed.

To permit the use of the baby carriage during cold or otherwise inclement weather, I provide means for enclosing and covering the sides of the cab. Along the borders 40 and 41 there is provided a plurality of spaced eyelets or sockets, generally designated by the numeral 46. A closure panel 48 best shown in Fig. 2, preferably made of leather or an imitation thereof similar to that used in constructing the other parts of the carriage is used. The closure panel is likewise provided along its border edge with equally spaced pintles 50 which are adapted to be detachably secured to the sockets 46. The closure panels 48 are thus easily and readily detachably secured to the cab of the carriage and when the closure panels are secured thereto the ventilating sides are covered and completely enclosed and the cab is thus closed except for the top in the same manner as a conventional cab.

While I have shown a particular form of detachable securing means for the closure panels, it will be understood that any other type of construction may be used. For example, the borders 40 and 41 on the sides of the cab may be provided with interlocking or zipper fasteners which will interlock with cooperating zipper fasteners on the closure panels 48. While I have shown the invention in connection with a collapsible or folding carriage, it will be understood that this invention may be used with equal facility on a non-collapsible carriage.

It will be understood that various changes and modifications may be made without departing from the spirit and scope of the appended claims.

I claim:

1. In a collapsible baby carriage of the character described including a plurality of side bars pivotally secured to each other on each side of the carriage, a U-shaped handle bar pivotally secured to said bars and extending upwardly thereof, a cab structure secured to said side bars, a running gear secured to said side bars and supporting said cab structure, said cab structure having a closed bottom, front and rear, said cab having a pair of opposed side members formed of a pliable reticulated material permitting the passage of air therethrough, and permitting the collapsing of said carriage, fastening elements secured to said side members, panel members adapted to be detachably secured to the fastening elements on the sides of said carriage and to cover and enclose said reticulated side members to enclose same and to prevent the passage of air therethrough.

2. In a baby carriage structure of the character described including a framework formed of a top frame member and side frame members, a U-shaped handle bar secured to said frame members and extending upwardly thereof, a running gear supporting said framework, a cab having a closed bottom, front and rear, and supported by said top frame member, said cab having a pair of opposed side walls formed of a pliable material of open network of the character similar to window screening and so constructed and arranged as to permit the passage of air through the sides of said cab, said pliable material being of sufficient flexibility to permit the collapsing of said carriage, fastening elements supported on said top frame member and on said cab and detachable panels adapted to be detachably secured to said fastening elements to cover and enclose said side walls and to prevent the passage of air therethrough.

3. In a baby carriage structure of the character described including a cab and a running gear supporting said cab, said cab having a closed bottom, front and rear, a U-shaped handle bar extending upwardly of said cab, said cab having a pair of opposed rigid side frame members, said side frame members supporting a pliable material of open network of the character similar to window screening so constructed as to permit the passage of air through the sides of said cab, fastening elements supported on said side frame members, and detachable panels adapted to be detachably secured to the fastening elements to cover and enclose the pliable material and to prevent the passage of air therethrough.

References Cited in the file of this patent

UNITED STATES PATENTS

| 506,329 | McClinchie | Oct. 10, 1893 |
| 520,699 | Neal | May 29, 1894 |
| 1,158,507 | Kolb | Nov. 2, 1915 |
| 1,203,706 | Cone | Nov. 7, 1916 |
| 1,620,660 | Houston | Mar. 15, 1927 |
| 1,897,525 | McGill | Feb. 14, 1933 |
| 2,296,193 | Siebert | Sept. 15, 1942 |
| 2,604,333 | Elmer | July 22, 1952 |